No. 774,034. PATENTED NOV. 1, 1904.
A. E. BRILLIÉ.
FUEL FEEDING MECHANISM FOR INTERNAL COMBUSTION MOTORS.
APPLICATION FILED JAN. 19, 1904.
NO MODEL. 6 SHEETS—SHEET 1.

No. 774,034. PATENTED NOV. 1, 1904.
A. E. BRILLIÉ.
FUEL FEEDING MECHANISM FOR INTERNAL COMBUSTION MOTORS.
APPLICATION FILED JAN. 19, 1904.
NO MODEL. 6 SHEETS—SHEET 3.

No. 774,034. PATENTED NOV. 1, 1904.
A. E. BRILLIÉ.
FUEL FEEDING MECHANISM FOR INTERNAL COMBUSTION MOTORS.
APPLICATION FILED JAN. 19, 1904.
NO MODEL. 6 SHEETS—SHEET 4.

No. 774,034. PATENTED NOV. 1, 1904.
A. E. BRILLIÉ.
FUEL FEEDING MECHANISM FOR INTERNAL COMBUSTION MOTORS.
APPLICATION FILED JAN. 19, 1904.
NO MODEL. 6 SHEETS—SHEET 5.

Witnesses: Inventor:
Auguste Eugene Brillié
by George Mason
his attorney

No. 774,034. PATENTED NOV. 1, 1904.
A. E. BRILLIÉ.
FUEL FEEDING MECHANISM FOR INTERNAL COMBUSTION MOTORS.
APPLICATION FILED JAN. 19, 1904.
NO MODEL. 6 SHEETS—SHEET 6.
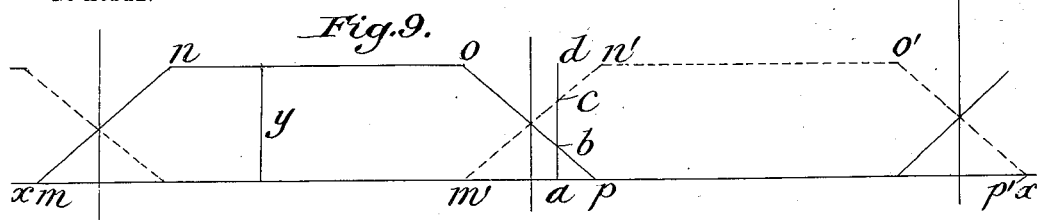
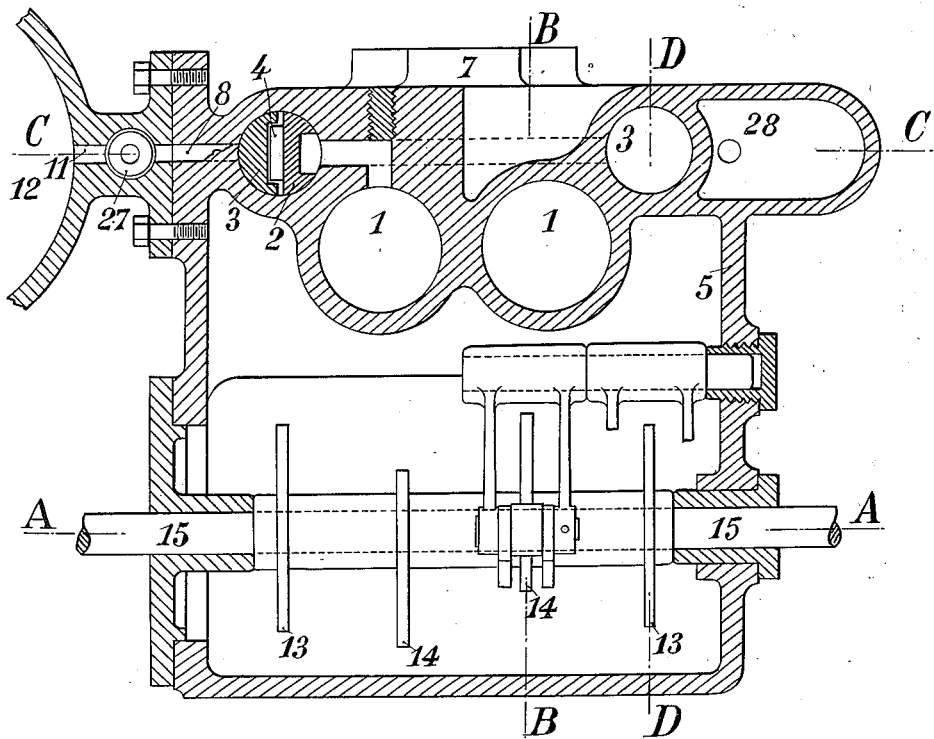
Witnesses:
Inventor:
Auguste Eugene Brillié
by Georgii Ollassid
his attorney No. 774,034. Patented November 1, 1904.

UNITED STATES PATENT OFFICE.

AUGUSTE EUGENE BRILLIÉ, OF PARIS, FRANCE.

FUEL-FEEDING MECHANISM FOR INTERNAL-COMBUSTION MOTORS.

SPECIFICATION forming part of Letters Patent No. 774,034, dated November 1, 1904.

Application filed January 19, 1904. Serial No. 189,720. (No model.)

*To all whom it may concern:*

Be it known that I, AUGUSTE EUGENE BRILLIÉ, of No. 20 Avenue Bosquet, Paris, France, have invented a certain new and useful Improved Fuel-Feeding Mechanism for Internal-Combustion Motors; and I do hereby declare the following to be a full, clear, and exact description of the invention, such as will enable others skilled in the art to which it appertains to make and use the same.

This invention refers to an apparatus for distributing liquid which allows of the attainment of a continuous supply in measured quantities of liquid hydrocarbon in the air-inlet of the motor.

The apparatus is specially adapted for motors in which the indraft takes place at regular intervals.

Figure 1:
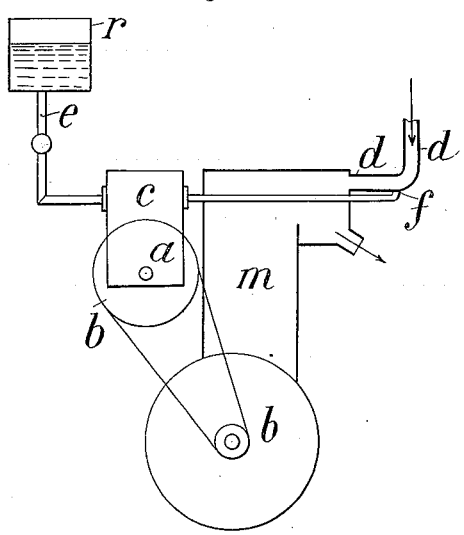
Figure 2:
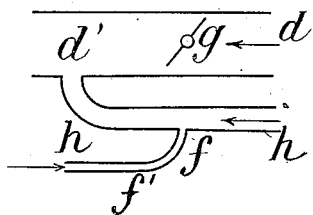
Figure 3:
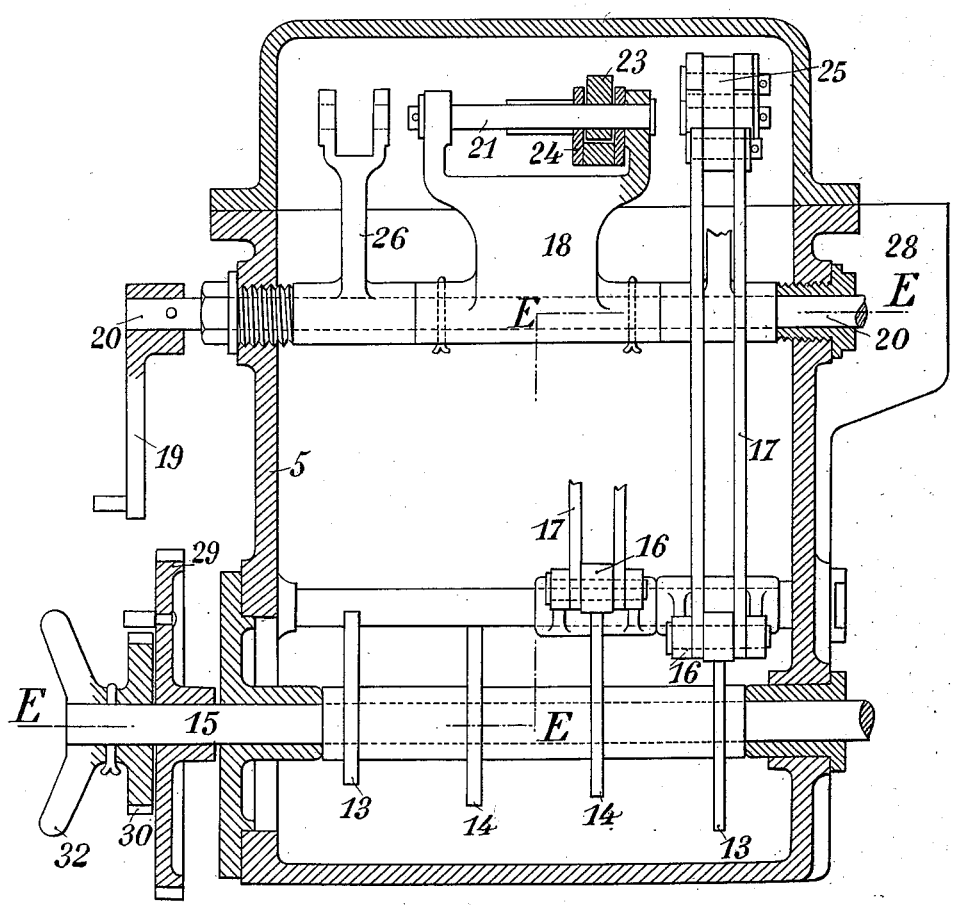
Figure 4:
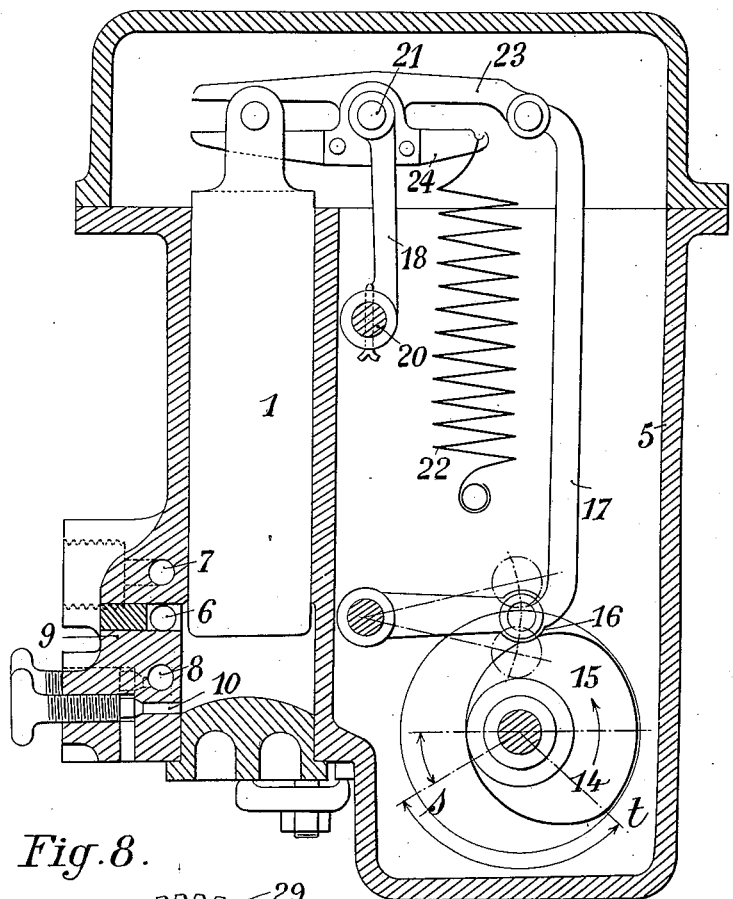
Figure 8:
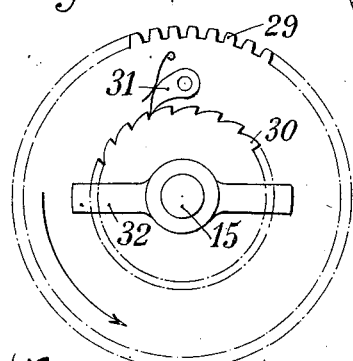
Figure 5:
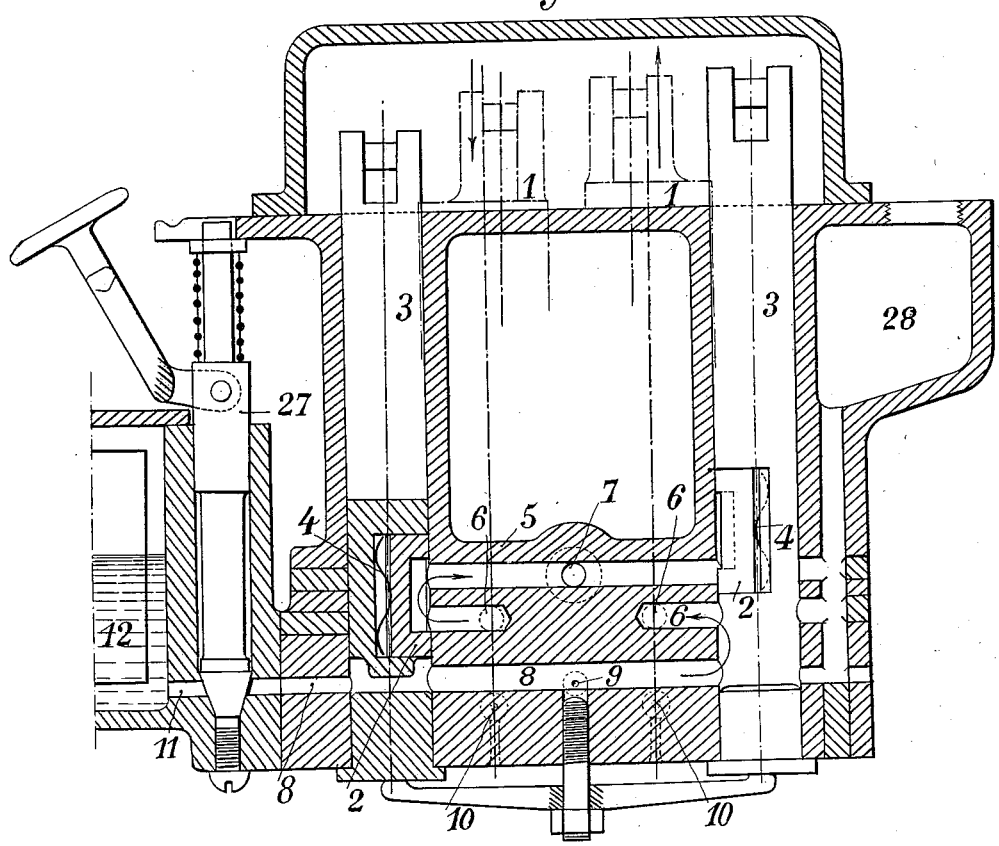
Figure 6:
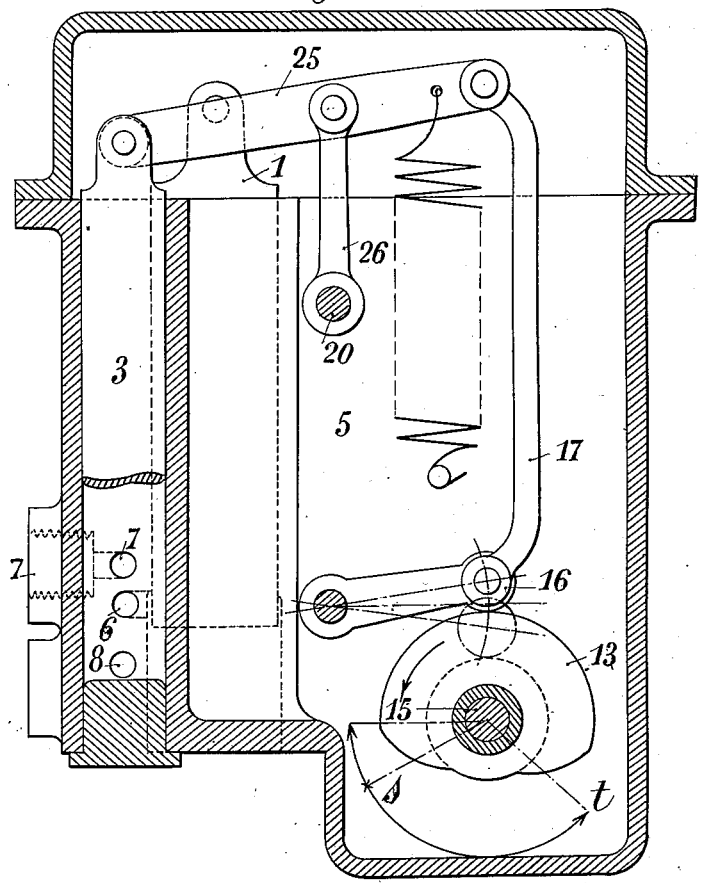

In the accompanying drawings, Figure 1 illustrates diagrammatically the invention embodied in a complete installation. Fig. 2 is a detail of a portion of Fig. 1. Fig. 3 is a vertical section on the line A A of Fig. 7. Fig. 4 is a vertical section on the line B B of Fig. 7. Fig. 5 is a vertical section on the line C C of Fig. 7. Fig. 6 is a vertical section on the line D D of Fig. 7. Fig. 7 is a sectional plan on the line E E E of Fig. 3. Fig. 8 is an end view of the operating-shaft, and Fig. 9 is a graphic representation of the principle of operation.

In Fig. 1 the motor $m$ produces by any known arrangement of transmission-gear $b\ b$ (chain, belting, gearing, toothed or equivalent) the rotation of the shaft $a$ of the distributing apparatus $c$. This shaft operates by cams or eccentrics two or more pumps adapted to insure a continuous flow and which receive the liquid from the reservoir $r$ and force it through an orifice $f$ into the air-inlet pipe $d$ of the motor in measured quantities according to the speed of the motor and the conditions of working under which it operates. The liquid can be forced to $f$ in different ways. It can, for example, as is shown in Fig. 2, be delivered into a pipe $h$, which is a branch of the air-intake $d$, in which a valve or diaphragm $g$ causes an obstruction, which insures a sufficient draft of air past $f$.

The carbureter or distributer comprises a pump with two or more pistons, with or without stuffing-boxes and with or without valves, operated by cams or eccentrics, &c. One of these arrangements is shown as a representative example in Figs. 3 to 7 of the drawings. This carbureter is characterized by the employment of two pumps without gear, which work although there may be loose fit of the pistons in the cylinders of the pumps, this being rendered possible by the liquid coming with a small head from the float-reservoir 12, Fig. 5, and escaping by the delivery-passage 7, arranged in a manner to be presently described. Two plungers 1 reciprocate vertically in two cylinders communicating by the passages 6 with the valve-chambers. The slide-valves 2 open communication between the pump-cylinders and either the supply-passage 8 or the delivery-passage 7, which terminates at the place of carburization in the air-intake—the point $f$ of Figs. 1 and 2. The liquid comes with a head through the passage 11, a float 12 limiting the level of the liquid in order that it may not tend to pass between the pistons and the cylinder-sufaces and overflow at the top. Also the place of carburization $f$ of Figs. 1 and 2 is arranged a little above the lower portion of the pumps without obstructing the passage in order that the pressure on delivery may be reduced to a minimum and under any circumstances be less than the head of the liquid, which would cause leakage between the pistons and the cylinder-surfaces.

The slide-valves 2 are represented as semicylindrical and are contained within a plunger-rod 3 of the same diameter, in which, by means of a spring 4, they are pressed against the walls in the neighborhood of the orifices.

At 9 and 10 there are passages closed by cone-ended screws, whereby the apparatus may be emptied of liquid.

The pistons 1 and slide-valves 2 and 3 are operated by cams 14 and 13. (With three or six pumps the operating may be effected by eccentrics.)

In the case we are considering the cams are so arranged that for each pump the time occupied by the delivery is longer than that taken to complete a half-revolution of the driving-shaft 15, and in consequence the suction takes less time than a half-revolution. The movements of the two piston are, respectively, not constrained to time with a half-revolution. Under these conditions the one pump has not completed its delivery-stroke until after the other has commenced. The profile of the cams is so designed that during the simultaneous deliveries of the two pumps the combined discharge will be the same as when one pump only is delivering.

Fig. 9 gives a graphic representation of what has just been described.

If along $x\,x$ be set off abscissæ proportional to the angular displacements of the shaft 15 and ordinates, such as $y$, proportional to the discharge from each pump-cylinder, a curved or polygonal figure is obtained, $m\,n.o\,p$ representing the discharge of one of the pumps and $m'\,n'\,o'\,p'$ for the other, the lengths $m\,m'$ or $p\,p'$ on the base-line $x\,x$ corresponding to a half-revolution of the shaft. During the period $(m'\,p)$ when the two pumps discharge at the same time we have $a\,b$ (discharge from the first pump) plus $a\,c$ (discharge from the second pump) equals $a\,d$ equals $y$ equals a constant. It is the anamorphosis of this figure that a suitable profile for the actuating-cams is determined.

Figs. 3 and 4 show the method of operation of the cams 14 on the pistons. They operate by the intermediary of rollers 16, of connecting-rods 17, and levers 23, pivoted at 21. The pivot 21 is arranged at the end of a supporting-lever 18, secured by pins to the shaft 20, which carries on the exterior end a lever or operating-crank 19, which permits of an angular displacement of the lever 18. By moving the pivot 21 of this lever nearer to or farther away from the piston the stroke of this latter, and in consequence the delivery, can be altered. A spring 22 acting on the lever-arm 24 serves to insure contact between the roller 16 and the cam 14 and at the same time to prevent all play in the transmission. This spring can alternatively be situated in the pump-cylinder, below the piston, tending to thrust it upward. The cams 13 operate the movement of the slide-valves by the intermediary of levers 25, pivoted onto the extremity of the supporting-levers 26, which are mounted freely on the axis 20. These cams cause the reversal of the movement of the slide-valves at the instant when the pistons 1 are at the bottom of their stroke—that is to say, at the points $s$ and $t$ of the cam 14. The working of the apparatus is as follows: The shaft 15 is connected with the shaft of the motor, as has been said already, by a transmitting mechanism which provides a suitable multiple of speed. By the position of the lever 19 operating on the support 18 the discharge required for each cylinder is adjusted. The position of the lever 19 can thus be graduated for the various combustible liquids which require different discharges—pure alcohol, carbureted alcohol, volatile essences, &c. The lever 19 is then fixed by any suitable detaining device. On the transmitter which operates the shaft 15 can be arranged a clutch-coupling or other arrangement controlled by a regulator for connecting the apparatus or putting it out of gear, and thus obtain full power or, by cutting off the liquid hydrocarbon, no power. The lever 19 can also be controlled by a regulator to modify the discharge by connecting, if there is space, the displacement of this lever with the arrangements for regulating the admission or obstruction of the air-supply. To set it in working order with a liquid which requires a preliminary heating—pure alcohol, for example—the apparatus 12, of constant level, is cut off by means of any suitable arrangement 27. The emptying of the liquid is effected by the cone-pointed screws 9 10, and the chamber 28 is filled with a more volatile liquid—spirit essence, for example. When the engine has started working, the pipe 11, communicating with the float-reservoir, is opened. In order to be sure of its working properly, the liquid should be at the point of carburization $f$, Fig. 1, before starting the working of the apparatus in order to be sure that it is free from air. For this purpose the wheel 29, Figs. 3 and 8, which operates the shaft 15, is mounted freely on this latter and moves it by means of a pawl 31 operating on a ratchet-wheel 30, pinned to the shaft. This ratchet-wheel is made in one with a hand-wheel 32, which can be turned by hand in the direction indicated by the arrow, which allows of the apparatus being worked by hand before setting it in operation with the motor.

Having thus fully set out my invention and the manner of its application and use, what I claim as new, and desire to secure by Letters Patent of the United States, is—

1. A fuel-feeding mechanism comprising a fuel-reservoir, a plurality of pumps, a supply-passage leading from the reservoir to the pumps, a discharge-passage leading from the pumps to the motor, a drive-shaft, means connecting the shaft with the pump-pistons and so arranged as to actuate the pistons of the pumps successively, the duration of the delivery-stroke of one pump overlapping that of another pump and the aggregate delivery of the pumps equaling the maximum delivery of one pump.

2. A fuel-feeding mechanism comprising a fuel-reservoir, two pumps, a supply-passage leading the fuel from the reservoir to the pumps under a head, a discharge-passage leading from the pumps to the motor, a drive-shaft, cams arranged on said shaft, means for actuating the pump-pistons and arranged to be operated by the cams, the cams operating the different pumps being so arranged relative to each other and their respective surfaces so proportioned that the delivery-stroke of each pump will occupy a greater time than the suction-stroke and the aggregate delivery of the pumps will be at all times equal to the maximum delivery of one pump.

3. A fuel-feeding mechanism comprising a fuel-reservoir, a plurality of pumps, a supply-passage leading the fuel by gravity from the reservoir to the pumps, a discharge-passage leading from the pumps to the motor, valves arranged to connect each pump-cylinder alternately with the supply and discharge passages, a drive-shaft, cams arranged on said shaft, means for actuating the pump-pistons and arranged to be operated by the cams, the respective cam-surfaces being so proportioned that the delivery-stroke of each pump will occupy a greater time than the suction-stroke and the cams operating the different pumps being so arranged relative to each other that the aggregate delivery of the pumps will be at all times equal to the maximum delivery of one pump, and other cams carried by the shaft and arranged to operate the valves in unison with their respective pumps.

4. A fuel-feeding mechanism comprising a fuel-reservoir, a plurality of pumps, a supply-passage leading the fuel from the reservoir to the pumps, a discharge-passage leading from the pumps to the motor, a drive-shaft, cams arranged on said shaft, levers each having one arm connected with a pump-piston, links connected with the other arm of each lever and arranged to be actuated by the cams, the cams being so arranged relative to each other and their respective surfaces so proportioned that the duration of the delivery-stroke of one pump will overlap that of another pump and the aggregate delivery of the pumps will equal the maximum delivery of one pump.

5. A fuel-feeding mechanism comprising a fuel-reservoir, a plurality of pumps, a supply-passage leading the fuel from the reservoir to the pump, a discharge-passage leading from the pump to the motor, a drive-shaft, cams arranged on said shaft, levers each having one arm connected with a pump-piston, links connected with the other arm of each lever and arranged to be actuated by the cams, means for varying the distance between the fulcrum of each lever and the point of connection with the piston, and the cams being so arranged relative to each other and their respective surfaces so proportioned that the duration of the delivery-stroke of one pump will overlap that of another pump and the aggregate delivery of the pumps will equal the maximum delivery of one pump.

6. A fuel-feeding mechanism comprising a fuel-reservoir, a plurality of pumps, a supply-passage leading the fuel from the reservoir to the pumps, a discharge-passage leading from the pumps to the motor, a drive-shaft, cams arranged on said shaft, pivotally-mounted standards, levers fulcrumed on said standards, said levers each having an arm connected by a slot with a pump-piston, means for shifting said standards to vary the distance between the fulcrum of each lever and its point of application to the piston, links connected one with the other arm of each lever and arranged to be actuated by the cams, the cams operating the different pumps being so arranged relative to each other and their respective surfaces so proportioned that the delivery-stroke of each pump will occupy a greater time than the suction-stroke and the aggregate delivery of the pumps will be constant and equal to the maximum delivery of one pump.

7. A fuel-feeding mechanism comprising a fuel-reservoir, a plurality of pumps, a supply-passage leading the fuel from the reservoir to the pumps, a discharge-passage leading from the pumps to the motor, a drive-shaft, cams arranged on said shaft, pivotally-mounted standards, levers fulcrumed on said standards, said levers each having an arm connected by a slot with a pump-piston, means for shifting said standards to vary the distance between the fulcrum of each lever and its point of application to the piston, links connected one with the other arm of each lever and arranged to be actuated by the cams to cause a delivery-stroke of the pistons, yielding means for returning the pistons in the direction of the suction-stroke, the cams operating the different pumps being so arranged relative to each other and their respective surfaces so proportioned that the delivery-stroke of each pump will occupy a greater time than the suction-stroke and the aggregate delivery of the pumps will be constant and equal to the maximum delivery of one pump.

8. A fuel-feeding mechanism comprising a fuel-reservoir, a plurality of pumps, a supply-passage leading the fuel from the reservoir to the pumps under a head, a discharge-passage leading from the pumps to the motor, valves arranged to connect each pump-cylinder alternately with the supply and discharge passages, a drive-shaft, cams arranged on said shaft, levers each having one arm connected with a pump-piston, links connected with the other arm of each lever and arranged to be actuated by the cams, means for varying the distance between the fulcrum of each lever and the point of connection with the piston, the cams being so arranged relative to each other and their respective surfaces so proportioned that the duration of the delivery-stroke of one pump will overlap that of another pump and the aggregate delivery of the pumps will equal the maximum delivery of one pump, and other cams carried by the shaft and arranged to operate the valves in unison with their respective pumps.

9. A fuel-feeding mechanism comprising a fuel-reservoir, a plurality of pumps, a supply-passage leading the fuel from the reservoir to the pumps under a head, a discharge-passage leading from the pumps to the motor, sliding valves arranged to connect each pump-cylinder alternately with the supply and discharge passages, a drive-shaft, cams arranged on said shaft, pivotally-mounted standards, levers fulcrumed on said standards, said levers each having an arm connected by a slot with a pump-piston, means for shifting said standards to vary the distance between the fulcrum of each lever and its point of application to the piston, links connected one with the other arm of each lever and arranged to be actuated by the cams, the cams operating the different pumps being so arranged relative to each other and their respective surfaces so proportioned that the delivery-stroke of each pump will occupy a greater time than the suction-stroke and the aggregate delivery of the pumps will be constant and equal to the maximum delivery of one pump, and other cams carried by the shaft and arranged to operate the valves in unison with their respective pumps.

10. A fuel-feeding mechanism comprising a fuel-reservoir, a plurality of pumps, a supply-passage leading the fuel from the reservoir to the pumps under a head, a discharge-passage leading from the pumps to the motor, sliding valves carried by a plunger-rod and arranged to connect each pump-cylinder alternately with the supply and discharge passages, a drive-shaft, cams arranged on said shaft, pivotally-mounted standards, levers fulcrumed on the standards, said levers each having an arm connected by a slot with a pump-piston, means for shifting said standards to vary the distance between the fulcrum of each lever and its point of application to the piston, links connected one with the other arm of each lever and arranged to be actuated by the cams, the cams operating the different pumps being so arranged relative to each other and their respective surfaces so proportioned that the delivery-stroke of each pump will occupy a greater time than the suction-stroke and the aggregate delivery of the pumps will be constant and equal to the maximum delivery of one pump, pivotally-mounted standards, levers mounted on the standards, one arm of each lever operatively connected with a valve-plunger, links connected one with the other arm of each valve-lever, and other cams carried by the shaft and arranged to actuate the links to operate the valves in unison with their respective pumps.

11. A fuel-feeding mechanism comprising a fuel-reservoir, a plurality of pumps, a supply-passage leading the fuel from the reservoir to the pumps under a head, a discharge-passage leading from the pumps to the motor, sliding valves carried by a plunger-rod and arranged to connect each pump-cylinder alternately with the supply and discharge passages, a drive-shaft, cams arranged on said shaft, pivotally-mounted standards, levers fulcrumed on said standards, said levers each having an arm connected by a slot with a pump-piston, means for shifting said standards to vary the distance between the fulcrum of each lever and its point of application to the piston, links connected one with the other arm of each lever and arranged to be actuated by the cams, the cams operating the different pumps being so arranged relative to each other and their respective surfaces so proportioned that the delivery-stroke of each pump will occupy a greater time than the suction-stroke and the aggregate delivery of the pumps will be constant and equal to the maximum delivery of one pump, pivotally-mounted standards, levers mounted on the standards, one arm of each lever operatively connected with a valve-plunger, links connected one with the other arm of each valve-lever, and other cams carried by the shaft and arranged to actuate the links to operate the valves in unison with their respective pumps, a connection between the motor and the drive-shaft, and means whereby the drive-shaft may be operated independently of the motor.

In witness whereof I have hereunto set my hand in presence of two witnesses.

AUGUSTE EUGENE BRILLIÉ.

Witnesses:
LOUIS GARDET,
HANSON C. COXE.